United States Patent
Bichler et al.

(10) Patent No.: US 10,005,695 B2
(45) Date of Patent: Jun. 26, 2018

(54) COMPOSITION BASED ON CALCIUM SILICATE HYDRATE

(71) Applicant: BASF SE, Ludwigshafen (DE)

(72) Inventors: Manfred Bichler, Engelsberg (DE); Torben Gädt, Traunstein (DE); Niklas Loges, Pittenhart (DE); Oliver Mazanec, Rosenheim (DE); Christoph Hesse, Ebersberg (DE)

(73) Assignee: BASF SE, Ludwigshafen (DE)

( * ) Notice: Subject to any disclaimer, the term of this patent is extended or adjusted under 35 U.S.C. 154(b) by 0 days. days.

(21) Appl. No.: 15/316,547

(22) PCT Filed: May 12, 2015

(86) PCT No.: PCT/EP2015/060424
§ 371 (c)(1),
(2) Date: Dec. 6, 2016

(87) PCT Pub. No.: WO2015/185333
PCT Pub. Date: Dec. 10, 2015

(65) Prior Publication Data
US 2017/0158561 A1  Jun. 8, 2017

(30) Foreign Application Priority Data

Jun. 6, 2014  (EP) .................................... 14171521

(51) Int. Cl.
| | | |
|---|---|---|
| C04B 24/26 | (2006.01) | |
| C04B 24/32 | (2006.01) | |
| C04B 28/04 | (2006.01) | |
| C04B 14/06 | (2006.01) | |
| C04B 22/00 | (2006.01) | |
| C04B 40/00 | (2006.01) | |
| C04B 103/14 | (2006.01) | |

(52) U.S. Cl.
CPC .............. C04B 24/32 (2013.01); C04B 14/06 (2013.01); C04B 22/00 (2013.01); C04B 28/04 (2013.01); C04B 40/0042 (2013.01); C04B 2103/14 (2013.01)

(58) Field of Classification Search
CPC ......... C04B 24/32; C04B 28/04; C04B 14/06; C04B 22/00; C04B 40/0042; C04B 2103/14
USPC ............................................................ 524/5
See application file for complete search history.

(56) References Cited

U.S. PATENT DOCUMENTS

| | | |
|---|---|---|
| 4,725,665 A | 2/1988 | Pieh et al. |
| 5,494,516 A | 2/1996 | Drs et al. |
| 5,609,681 A | 3/1997 | Drs et al. |
| 5,798,425 A | 8/1998 | Albrecht et al. |
| 6,211,317 B1 | 4/2001 | Albrecht et al. |
| 6,620,879 B1 | 9/2003 | Albrecht et al. |
| 6,946,510 B2 | 9/2005 | Suau et al. |
| 7,601,770 B2 | 10/2009 | Inoue et al. |
| 7,910,640 B2 | 3/2011 | Wieland et al. |
| 7,973,110 B2 | 7/2011 | Lorenz et al. |
| 8,242,218 B2 | 8/2012 | Lorenz et al. |
| 8,481,116 B2 | 7/2013 | Bleibler et al. |
| 8,519,029 B2 | 8/2013 | Lorenz et al. |
| 8,653,186 B2 | 2/2014 | Nicoleau et al. |
| 9,045,377 B2 | 6/2015 | Nicoleau et al. |
| 2004/0019148 A1 | 1/2004 | Suau et al. |
| 2005/0124737 A1 | 6/2005 | Inoue et al. |
| 2005/0143511 A1 | 6/2005 | Suau et al. |
| 2008/0108732 A1 | 5/2008 | Wieland et al. |
| 2009/0199741 A1 | 8/2009 | Bleibler et al. |
| 2009/0312460 A1 | 12/2009 | Lorenz et al. |
| 2009/0312504 A1 | 12/2009 | Lorenz et al. |
| 2011/0269875 A1* | 11/2011 | Nicoleau .................. C04B 28/02 524/2 |
| 2011/0313112 A1 | 12/2011 | Lorenz et al. |
| 2012/0220696 A1 | 8/2012 | Nicoleau et al. |
| 2012/0270970 A1* | 10/2012 | Bichler .................. C04B 28/04 524/5 |
| 2014/0235760 A1* | 8/2014 | Bichler ............... C04B 24/2647 524/5 |

(Continued)

FOREIGN PATENT DOCUMENTS

| | | |
|---|---|---|
| DE | 29 48 698 A1 | 6/1981 |
| DE | 35 30 258 A1 | 2/1987 |

(Continued)

OTHER PUBLICATIONS

PCT/EP2015/060424—International Search Report, dated Aug. 17, 2015. English Translation.
PCT/EP2015/060424—International Written Opinion, dated Aug. 17, 2015. English Translation.
PCT/EP2015/060424—International Preliminary Report on Patentability, dated Dec. 6, 2016.

(Continued)

*Primary Examiner* — Hui Chin
(74) *Attorney, Agent, or Firm* — Curatolo Sidoti Co., LPA; Joseph G. Curatolo; Salvatore A. Sidoti (57) ABSTRACT

The invention relates to a composition comprising 5-50 wt % of calcium silicate hydrate, 10-60 wt % of at least one water-soluble, acid group-containing polymer comprising polyether groups, and 5-40 wt % of at least one polyalkylene glycol ether. Further disclosed is a process for preparing this composition, and cementitious mixtures comprising the composition. A further aspect of the present invention is the use of the composition of the invention in cementitious mixtures for accelerating the development over time of the dispersing action of the acid group-containing polymer after addition of the mixing water and a subsequently accelerated curing of the mixture.

15 Claims, 2 Drawing Sheets

(56) References Cited

U.S. PATENT DOCUMENTS

2015/0299042 A1 10/2015 Hesse et al.
2015/0344368 A1 12/2015 Hesse et al.

FOREIGN PATENT DOCUMENTS

| DE | 195 13 126 A1 | 10/1996 |
| DE | 198 34 173 A1 | 2/1999 |
| DE | 199 05 488 A1 | 8/2000 |
| EP | 0 607 389 | 7/1994 |
| EP | 2 574 636 A1 | 4/2013 |
| WO | WO 01/96007 A1 | 12/2001 |
| WO | WO 2006/027363 A1 | 3/2006 |
| WO | WO 2006/042709 A1 | 4/2006 |
| WO | WO 2010/026155 A1 | 3/2010 |
| WO | WO 2010/040612 A1 | 4/2010 |
| WO | WO 2011/026720 A1 | 3/2011 |
| WO | WO 2011/029711 A1 | 3/2011 |
| WO | WO 2014/114782 A1 | 7/2014 |
| WO | WO 2014/114784 A1 | 7/2014 |

OTHER PUBLICATIONS

Chopin, David, et al., "Why Do HPC and SCC Require Longer Mixing Time?", Cement and Concrete Research, Feb. 17, 2004, vol. 34, pp. 2237-2243.

* cited by examiner

COMPOSITION BASED ON CALCIUM SILICATE HYDRATE

CROSS REFERENCE TO RELATED APPLICATIONS

This application is a national stage application of International Application No. PCT/EP2015/060424, filed 12 May 2015, which claims priority from European Patent Application No. 14171521.9, filed 6 Jun. 2014, which applications are incorporated herein by reference.

The invention relates to a composition based on calcium silicate hydrate, at least one water-soluble, acid group-containing polymer comprising polyether groups, and at least one polyalkylene glycol ether. Further disclosed is a process for preparing this composition, and cementitious mixtures comprising the composition. A further aspect of the present invention is the use of the composition of the invention in cementitious mixtures for accelerating the development over time of the dispersing action of the acid group-containing polymer after addition of the mixing water and a subsequently accelerated curing of the mixture.

In order to achieve improved processing qualities, i.e., kneadability, spreadability, sprayability, pumpability or fluidity, for inorganic suspensions of solids, such suspensions are often admixed with admixtures in the form of dispersants or plasticizers.

Inorganic solids of these kinds usually, in the construction industry, comprise inorganic binders such as, for example, cement based on Portland cement (EN 197), cement with particular qualities (DIN 1164), white cement, calcium aluminate cement or high-alumina cement (EN 14647), calcium sulfoaluminate cement, specialty cements, calcium sulfate n-hydrate (n=0 to 2), lime or building lime (EN 459), and also pozzolans and latent hydraulic binders such as flyash, metakaolin, silica dust, and slag sand, for example. The inorganic suspensions of solids generally further comprise fillers, more particularly aggregate consisting, for example, of calcium carbonate, quartz or other natural rocks in different granular sizes and granular morphologies, and also further inorganic and/or organic additives (admixtures) for the targeted influencing of properties of chemical-based construction products, such as hydration kinetics, rheology or air content, for example. Additionally it is possible for organic binders to be present, such as latex powders, for example.

In order to convert building material mixtures, especially those based on inorganic binders, into a ready-to-use, processable form, it is generally necessary to use substantially more mixing water than theoretically required for the subsequent hydration or hardening process. The void fraction in the building element, formed by the excess water that later evaporates, results in significantly impaired mechanical strength, stability, and durability of adhesion.

In order to reduce this excess water fraction in the case of a given processing consistency and/or in order to improve the processing qualities in the case of a given water/binder ratio, admixtures are used which within the construction chemicals segment are generally referred to as water reducers or plasticizers. Known such admixtures include, in particular, polycondensation products based on naphthalenesulfonic or alkylnaphthalenesulfonic acids, or melamine-formaldehyde resins containing sulfonic acid groups.

DE 3530258 describes the use of water-soluble sodium naphthalenesulfonic acid-formaldehyde condensates as admixtures for inorganic binders and building materials. These admixtures are described for improving the fluidity of the binders such as cement, anhydrite or gypsum, for example, and also the building materials produced using them.

DE 2948698 describes hydraulic mortars for screeds that comprise plasticizers based on melamine-formaldehyde condensation products, and/or sulfonated formaldehyde-naphthalene condensates and/or lignosulfonate, and comprising, as binders, Portland cement, clay-containing lime marl, clay clinker, and underburned clinker.

In addition to the purely anionic plasticizers, which comprise essentially carboxylic acid and sulfonic acid groups, a more recent group of plasticizers described comprises weakly anionic comb polymers, which typically carry anionic charges on the main chain and include nonionic polyalkylene oxide side chains. These copolymers are also referred to as polycarboxylate ethers (PCEs).

Polycarboxylate ethers not only disperse the inorganic particles via electrostatic charging, owing to the anionic groups (carboxylate groups, sulfonate groups) contained on the main chain, but also additionally stabilize the dispersed particles by steric effects, owing to the polyalkylene oxide side chains, which by absorbing water molecules form a stabilizing protective layer around the particles. As a result, it is either possible to reduce the required amount of water for the formulating of a particular consistency, as compared with the conventional plasticizers, or else the addition of the polycarboxylate ethers reduces the plasticity of the wet building-material mixture to such an extent that it is possible to produce self-compacting concrete or self-compacting mortar at low water/cement ratios. The use of the polycarboxylate ethers also makes it possible to produce ready-mixed concrete or ready-mixed mortar that remains pumpable for lengthy periods of time, or to produce high-strength concretes or high-strength mortars through the setting of a low water/cement ratio.

WO 01/96007 describes said weakly anionic plasticizers and grinding assistants for aqueous mineral suspensions, these being prepared by radical polymerization of monomers containing vinyl groups, and comprising polyalkylene oxide groups as a principal component.

DE 19513126 and DE 19834173 describe copolymers based on unsaturated dicarboxylic acid derivates and oxyalkylene glycol alkenyl ethers and the use thereof as admixtures for hydraulic binders, especially cement.

In addition to the polycarboxylate ethers described, a series of derivatives with a modified activity profile have also since become known. Thus, for example, US 2009312460 describes polycarboxylate esters, the ester function being hydrolyzed following introduction into a cementitious, aqueous mixture, thereby forming a polycarboxylate ether. An advantage of polycarboxylate esters was that they develop their activity in the cementitious mixture only after a certain time, and consequently the dispersing effect can be maintained over a lengthy period of time.

Known, moreover, from DE 199 05 488 are pulverulent polymer compositions based on polyether carboxylates, comprising 5 to 95 wt % of the water-soluble polymer and 5 to 95 wt % of a finely divided mineral carrier material. The products are produced by contacting the mineral carrier material with a melt or an aqueous solution of the polymer. Advantages cited for this product by comparison with spray-dried products include significantly enhanced sticking and caking resistance.

WO 2006/027363 discloses a process for producing a coated base material for the hydraulic composition. Disclosed in the examples is, among other disclosures, the coating of a Portland cement with 1% of an aqueous polycarboxylate ether solution, based on the binder weight.

A further class of dispersant compounds having polyether side chains is described in WO 2006/042709. These are polycondensation products based on an aromatic or heteroaromatic compound (A) having 5 to 10 C atoms and/or heteroatoms with at least one oxyethylene or oxypropylene radical, and an aldehyde (C) selected from the group of formaldehyde, glyoxylic acid, and benzaldehyde, or mixtures thereof, which bring about a very good fluidizing effect for inorganic binder suspensions and maintain this effect over a relatively long period of time. In one particular embodiment, the polycondensation products in question may be phosphated polycondensation products.

It has emerged that plasticizers based on lignosulfonate, melaminesulfonate, and polynaphthalenesulfonate are markedly inferior in their activity to the weakly anionic, polyalkylene oxide-containing copolymers and the condensation products described in WO 2006/042709.

Dispersants based on polycarboxylate ethers and derivatives thereof, and also the condensation products described in WO 2006/042709, are offered either as solids in powder form or as aqueous solutions. Dispersants in powder form may be admixed during their production with a factory dry-mix mortar, for example. When the factory dry-mix mortar is mixed with water, the dispersants dissolve and are subsequently able to develop their activity.

Alternatively it is also possible for polycarboxylate ethers or derivatives thereof, and also the condensation products described in WO 2006/042709, to be added in dissolved form to the inorganic suspension of solids. In particular, the dispersant may be metered directly into the mixing water.

A disadvantage of these methods for incorporating plasticizers into an inorganic suspension of solids, however, is that the dispersing activity does not develop immediately after addition of the mixing water. Irrespective of whether the dispersant is added as a powder or in aqueous solution, it may take more than 100 seconds, for example, in the case of a dry-mix mortar—depending on water-to-cement ratio (w/c) or water demand—for a homogeneous suspension to form with vigorous stirring after the addition of the mixing water. This delay is a problem particularly in the context of the use of mixing pumps.

EP2574636 describes a pulverulent composition producible by contacting a powder which comprises at least one inorganic binder with 0.01 to 10 wt %, based on the overall mass of the composition, with a liquid component comprising a dispersant based on acid group-containing polymers which comprise polyether groups, and at least 30 wt % of an organic solvent. The powders thus produced exhibit a significant improvement in development of the dispersing activity over time. A disadvantage for many applications, however, is the relatively slow curing of these systems.

In order to be able to compare the time required to obtain a homogeneous inorganic suspension of solids, a known means is to determine the so-called stabilization time $t_s$. The stabilization time can be calculated from the plotted power curve of a mixing tool. In this regard, the following publications are referenced: 1.) Chopin, D.; de Larrad, F.; Cazacliu, B.: Why do HPC and SCC require a longer mixing time? Cement and Concrete Research 34, 2004, pp. 2237-2243; 2.) Mazanec, O.: Charakterisierung der Mischzeit and des rheologischen Verhaltens ultrahochfester Betone unter Einbeziehung interpartikularer Wechselwirkungen [Characterizing the mixing time and the rheological behavior of ultra high-strength concretes, including interparticulate interactions], Dissertation, Munich Technical University, 2013; 3.) Mazanec, O.; Schießl, P.: Mixing Time Optimisation for UHPC. Ultra High Performance Concrete (UHPC). In: Second International Symposium on Ultra High Performance Concrete, Mar. 5-7, 2008, pp. 401-408, ISBN: 978-3-89958-376-2.

The stabilization time ($t_s$) is defined as the time at which the power curve of the mixing tool approaches the asymptote after the maximum drive power has been reached. The suspension of solids here is homogeneous as soon as there is no longer any significant fall in the power curve. In this regard, the following publication is also referenced: Schießl, P.; Mazanec, O.; Lowke, D.: SCC and UHPC—Effect of Mixing Technology on Fresh Concrete Properties. Advances in Constructions Materials 2007, Symposium to honor H. W. Reinhardt, University of Stuttgart, 23-24 Jul. 2007.

It was an object of the present invention, accordingly, to provide a cementitious binder system which exhibits rapid development over time of the dispersing activity of the plasticizer following addition of mixing water and, at the same time, exhibits rapid hardening of the cementitious system.

This object has been achieved by means of a composition comprising 5-50 wt %, more particularly 10 to 45 wt %, preferably 15 to 40 wt %, especially preferably 20 to 40 wt % of calcium silicate hydrate, 10-60 wt %, more particularly 20 to 55 wt %, preferably 25 to 50 wt %, especially preferably 25 to 40 wt % of at least one water-soluble, acid group-containing polymer comprising polyether groups, 5-40 wt %, more particularly 10 to 40 wt %, preferably 20 to 40 wt %, especially preferably 25 to 35 wt % of at least one polyalkylene glycol ether of the formula (1)

where $R^\alpha$ is hydrogen or an aliphatic hydrocarbon radical having 1 to 20 C atoms, a cycloaliphatic hydrocarbon radical having 5 to 8 C atoms, or an optionally substituted aryl radical having 6 to 14 C atoms, the aryl radical comprising no acid groups, and β independently at each occurrence and in a manner identical or different for each ($C_\beta H_{2\beta}O$) unit is 2, 3, 4 or 5, and ω is 3 to 200.

It is essential to the invention that the polymer of the invention comprises an acid group. The term "acid group" in the present patent application refers both to the free acid and to the salts thereof. The acid may preferably be at least one from the series of carboxyl, phosphono, sulfino, sulfo, sulfamido, sulfoxy, sulfoalkyloxy, sulfinoalkyloxy, and phosphonooxy group. Particularly preferred are carboxyl and phosphonooxy groups.

In one preferred embodiment the polyether groups of the at least one water-soluble, acid group-containing polymer are polyether groups of the structural unit (I)

where

\* indicates the bonding site to the acid group-containing polymer,

U is a chemical bond or an alkylene group having 1 to 8 C atoms,

X is oxygen, sulfur or a group $NR^1$,
k is 0 or 1,
n is an integer whose average value, based on the acid group-containing polymer, is in the range from 3 to 300,
Alk is $C_2$-$C_4$ alkylene, and within group (Alk-O)$_n$ Alk may be identical or different,
W is a hydrogen, a $C_1$-$C_6$ alkyl, or an aryl radical or is the group Y—F, where
Y is a linear or branched alkylene group having 2 to 8 C atoms and may carry a phenyl ring,
F is a 5- to 10-membered nitrogen heterocycle which is bonded via nitrogen and which as ring members, besides the nitrogen atom and beside carbon atoms, may have 1, 2 or 3 additional heteroatoms selected from oxygen, nitrogen, and sulfur, it being possible for the nitrogen ring members to have a group $R^2$, and for 1 or 2 carbon ring members to be present in the form of a carbonyl group,
$R^1$ is hydrogen, $C_1$-$C_4$ alkyl or benzyl, and
$R^2$ is hydrogen, $C_1$-$C_4$ alkyl or benzyl.

In one particularly preferred embodiment, the water-soluble, acid group-containing polymer comprising polyether groups represents a polycondensation product comprising (II) a structural unit containing an aromatic or heteroaromatic and a polyether group, and (III) a phosphated structural unit containing an aromatic or heteroaromatic.

The structural units (II) and (III) are represented preferably by the following general formulae $$A\text{-}U\text{---}(C(O))_k\text{---}X\text{-}(AlkO)_n\text{---}W \quad (II)$$

where

A is identical or different and is represented by a substituted or unsubstituted, aromatic or heteroaromatic compound having 5 to 10 C atoms in the aromatic system, the other radicals possessing the definition stated for structural unit (I);

$$D\text{---}E\text{---}\left(\begin{array}{c}H\ H\\ |\ |\\ -C\text{---}C\text{---}O\\ |\ |\\ R^3\ R^4\end{array}\right)_b\text{---}P\begin{array}{c}O\\ \|\\ \diagdown\end{array}\begin{array}{c}OH\\ OH\end{array}\Bigg)_m \quad (III)$$

where

D is identical or different and is represented by a substituted or unsubstituted, aromatic or heteroaromatic compound having 5 to 10 C atoms in the aromatic system.

Furthermore, E is identical or different and is represented by N, NH or O, m=2 if E=N and m=1 is E=NH or O.

$R^3$ and $R^4$ are, independently of one another, identical or different and are represented by a branched or unbranched $C_1$ to $C_{10}$ alkyl radical, $C_5$ to $C_8$ cycloalkyl radical, aryl radical, heteroaryl radical or H, preferably by H, methyl, ethyl or phenyl, more preferably by H or methyl, and especially preferably by H. Furthermore, b is identical or different and is represented by an integer from 0 to 300. If b=0, E=O. With particular preference D=phenyl, E=O, $R^3$ and $R^4$=H, and b=1.

The polycondensation product preferably comprises a further structural unit (IV) which is represented by the following formula $$\begin{array}{c}Y\ \ Y\\ \diagdown\diagup\\ R^5\diagup\diagdown R^6\end{array} \quad (IV)$$

where

Y independently at each occurrence is identical or different and is represented by (II), (III) or further constituents of the polycondensation product.

$R^5$ and $R^6$ are preferably identical or different and are represented by H, $CH_3$, COOH or a substituted or unsubstituted aromatic or heteroaromatic compound having 5 to 10 C atoms. In structural unit (IV) here, $R^5$ and $R^6$ independently of one another are preferably represented by H, COOH and/or methyl.

In one particularly preferred embodiment, $R^5$ and $R^6$ are represented by H.

The molar ratio of the structural units (II), (III), and (IV) in the phosphated polycondensation product of the invention may be varied within wide ranges. It has proven useful for the molar ratio of the structural units [(II)+(III)]:(IV) to be 1:0.8 to 3, preferably 1:0.9 to 2, and more preferably 1:0.95 to 1.2.

The molar ratio of the structural units (II):(III) is normally 1:10 to 10:1, preferably 1:7 to 5:1, and more preferably 1:5 to 3:1.

The groups A and D in the structural units (II) and (III) of the polycondensation products are generally represented by phenyl, 2-hydroxyphenyl, 3-hydroxyphenyl, 4-hydroxyphenyl, 2-methoxyphenyl, 3-methoxyphenyl, 4-methoxyphenyl, naphthyl, 2-hydroxynaphthyl, 4-hydroxynaphthyl, 2-methoxynaphthyl, 4-methoxynaphthyl, preferably phenyl, and A and D may be selected independently of one another and may also each consist of a mixture of the stated compounds. The groups X and E are represented independently of one another preferably by O.

In structural unit (I), n is preferably represented by an integer from 5 to 280, more particularly 10 to 160, and more preferably 12 to 120, and in structural unit (III), b is preferably represented by an integer from 0 to 10, preferably 1 to 7, and more preferably 1 to 5. The respective radicals whose length is defined by n and b, respectively, may consist here of unitary structural groups, although it may also be useful for there to be a mixture of different structural groups. Furthermore, the radicals of the structural units (II) and (III) independently of one another may each possess the same chain length, with n and b each being represented by one number. In general, however, it will be useful for there to be in each case mixtures with different chain lengths, so that the radicals of the structural units in the polycondensation product have different numerical values for n and, independently, for b.

In one particular embodiment, furthermore, the present invention provides for a sodium, potassium, ammonium and/or calcium salt, and preferably a sodium and/or potassium salt, of the phosphated polycondensation product.

The phosphated polycondensation product of the invention frequently has a weight-average molecular weight of 4000 g/mol to 150 000 g/mol, preferably 10 000 to 100 000 g/mol, and more preferably 20 000 to 75 000 g/mol.

With regard to the phosphated polycondensation products for preferred use in accordance with the present invention, and their preparation, reference is additionally made to patent applications WO 2006/042709 and WO 2010/040612, whose content is hereby incorporated into the present application.

In a further preferred embodiment, the acid group-containing polymer comprises at least one copolymer obtainable by polymerization of a mixture of monomers comprising (V) at least one ethylenically unsaturated monomer which comprises at least one radical from the series of carboxylic acid, carboxylic salt, carboxylic ester, carboxylic amide, carboxylic anhydride, and carboxylic imide and (VI) at least one ethylenically unsaturated monomer having a polyether group, the polyether group being represented preferably by the structural unit (I).

The copolymers in accordance with the present invention comprise at least two monomer units. It may, however, also be advantageous to use copolymers having three or more monomer units.

In one preferred embodiment, the ethylenically unsaturated monomer (V) is represented by at least one of the following general formulae from the group of (Va), (Vb), and (Vc):

In the monocarboxylic or dicarboxylic acid derivative (Va) and the monomer (Vb) present in cyclic form, where Z=O (acid anhydride) or $NR^{16}$ (acid imide), $R^7$ and $R^8$ independently of one another are hydrogen or an aliphatic hydrocarbon radical having 1 to 20 C atoms, preferably a methyl group. B is H, —$COOM_a$, —CO—O($C_qH_{2q}O)_r$—$R^9$, —CO—NH—$(C_qH_{2q})_r$—$R^9$.

M is hydrogen, a mono-, di- or trivalent metal cation, preferably sodium, potassium, calcium or magnesium ion, additionally ammonium or an organic amine radical, and a=1/3, 1/2 or 1, according to whether M is a mono-, di- or trivalent cation. Organic amine radicals used are preferably substituted ammonium groups which derive from primary, secondary or tertiary $C_{1-20}$ alkylamines, $C_{1-25}$ alkanolamines, $C_{5-8}$ cycloalkylamines, and $C_{6-14}$ arylamines. Examples of the amines in question are methylamine, dimethylamine, trimethylamine, ethanolamine, diethanolamine, triethanolamine, methyldiethanolamine, cyclohexylamine, dicyclohexylamine, phenylamine, diphenylamine in the protonated (ammonium) form.

$R^9$ is hydrogen, an aliphatic hydrocarbon radical having 1 to 20 C atoms, a cycloaliphatic hydrocarbon radical having 5 to 8 C atoms, an aryl radical having 6 to 14 C atoms, which optionally may also be substituted, q=2, 3 or 4, and r=0 to 200, preferably 1 to 150. The aliphatic hydrocarbons here may be linear or branched and also saturated or unsaturated. Considered preferred cycloalkyl radicals are cyclopentyl or cyclohexyl radicals; considered preferred aryl radicals are phenyl or naphthyl radicals; and these radicals in particular may also be substituted by hydroxyl, carboxyl or sulfonic acid groups.

Moreover, Z is O or $NR^{16}$, where $R^{16}$ independently at leach occurrence is identical or different and is represented by a branched or unbranched $C_1$ to $C_{10}$ alkyl radical, $C_5$ to $C_8$ cycloalkyl radical, aryl radical, heteroaryl radical or H.

The following formula shows the monomer (Vc):

In this formula, $R^{10}$ and $R^{11}$ independently of one another are hydrogen or an aliphatic hydrocarbon radical having 1 to 20 C atoms, a cycloaliphatic hydrocarbon radical having 5 to 8 C atoms, or an optionally substituted aryl radical having 6 to 14 C atoms.

Moreover, $R^{12}$ is identical or different and is represented by $(C_nH_{2n})$—$SO_3H$ with n=0, 1, 2, 3 or 4, $(C_nH_{2n})$—OH with n=0, 1, 2, 3 or 4; $(C_{n1}H_{2n})$—$PO_3H_2$ with n=0, 1, 2, 3 or 4, $(C_nH_{2n})$—$OPO_3H_2$ with n=0, 1, 2, 3 or 4, $(C_6H_4)$—$SO_3H$, $(C_6H_4)$—$PO_3H_2$, $(C_6H_4)$—$OPO_3H_2$ and $(C_nH_{2n})$—$NR^{14}{}_b$ with n=0, 1, 2, 3 or 4 and b is represented by 2 or 3.

$R^{13}$ is H, —$COOM_a$, —CO—O($C_qH_{2q}O)_r$—$R^9$, —CO—NH—$(C_qH_{2q}O)_r$—$R^9$, where $M_a$, $R^9$, q and r possess the definitions stated above.

$R^{14}$ is hydrogen, an aliphatic hydrocarbon radical having 1 to 10 C atoms, a cycloaliphatic hydrocarbon radical having 5 to 8 C atoms, or an optionally substituted aryl radical having 6 to 14 C atoms.

Furthermore, Q is identical or different and is represented by NH, $NR^{15}$ or O, where $R^{15}$ is an aliphatic hydrocarbon radical having 1 to 10 C atoms, a cycloaliphatic hydrocarbon radical having 5 to 8 C atoms, or an optionally substituted aryl radical having 6 to 14 C atoms.

In one particularly preferred embodiment the ethylenically unsaturated monomer (VI) is represented by the following general formulae in which all radicals have the abovementioned meanings.

The average molecular weight $M_w$ of the copolymer of the invention as determined by gel permeation chromatography (GPC) is preferably 5000 to 200 000 g/mol, more preferably 10 000 to 80 000 g/mol, and very preferably 20 000 to 70 000 g/mol. The polymers were analyzed for average molar mass and conversion by means of size extrusion chromatography (column combinations: OH-Pak SB-G, OH-Pak SB 804 HQ, and OH-Pak SB 802.5 HQ from Shodex, Japan; eluent: 80 vol % aqueous solution of $HCO_2NH_4$ (0.05 mol/l) and 20 vol % acetonitrile; injection volume 100 μl; flow rate 0.5 ml/min). The calibration to determine the average molar mass took place with linear polyethylene glycol standards. As a measure of the conversion, the peak of the copolymer is standardized to a relative height of 1, and the height of the peak of the unreacted macromonomer/PEG-containing oligomer is used as a measure of the residual monomer content.

The copolymer of the invention preferably meets the requirements of industrial standard EN 934-2 (February 2002).

In one preferred embodiment, in formula (1) of the polyalkylene glycol ether, $R^\alpha$ is an aliphatic hydrocarbon radical having 1 to 4 C atoms, more particularly 1 C atom, $\beta$ independently at each occurrence, in a manner identical or different for each $(C_\beta H_{2\beta}O)$ unit, is 2 or 3, more particularly 2, and $\omega$ is 8 to 100, more particularly 10 to 25.

In a further-preferred embodiment, the polyalkylene glycol ethers of the formula (1) are polyethylene glycol ethers or polypropylene glycol ethers or random ethylene oxide/propylene oxide copolymers having an average molar mass of 200 to 2000 g/mol, methyl, ethyl, propyl, butyl or higher alkyl polyalkylene glycol ethers, as for example polypropylene glycol monomethyl ether, butyl polyethylene glycol ether, propyl polyethylene glycol ether, ethyl polyethylene glycol ether, methylpolyethylene glycol ether with an average molar mass of 200 to 2000 g/mol.

In one particularly preferred embodiment, the polyalkylene glycol ethers of the formula (1) are methylpolyethylene glycol ethers having an average molar mass of 200 to 1000 g/mol, more particularly 500 g/mol.

The calcium silicate hydrate in the composition of the invention is preferably in the form of foshagite, hillebrandite, xonotlite, nekoite, clinotobermorite, 9 Å tobermorite (tiversiderite), 11 Å tobermorite, 14 Å tobermorite (plombierite), jennite, metajennite, calcium chondrodite, afwillite, $\alpha$-$Ca_2[SiO_3(OH)](OH)$, dellaite, jaffeite, rosenhahnite, killalaite and/or suolunite, more preferably as xonotlite, 9 Å tobermorite (riversiderite), 11 Å tobermorite, 14 Å tobermorite (plombierite), jennite, metajennite, afwillite and/or jaffeite. In a further-preferred embodiment, the calcium silicate hydrate is in amorphous form. The molar ratio of calcium to silicon in the calcium silicate hydrate is preferably from 0.6 to 2, preferably 0.8 to 1.8, more preferably 0.9 to 1.6, especially preferably 1.0 to 1.5. The molar ratio of calcium to water in the calcium silicate hydrate is preferably 0.6 to 6, more preferably 0.6 to 2, and especially preferably 0.8 to 2.

In one particularly preferred embodiment, the composition of the invention is in powder form. In this case it is preferred for the acid group-containing polymer and the polyalkylene glycol ether to be present in distribution over the surface of particles comprising the calcium silicate hydrate. The particles in this case may, in addition to the calcium silicate hydrate that is essential to the invention, comprise other compounds, and more particularly salts, which in particular may come from the production process of the calcium silicate hydrate. Compounds in question may be, for example, sodium nitrate, sodium acetate and/or silicon dioxide. These other compounds may be present in the composition of the invention in particular in an amount of 0.1 to 35 wt %, preferably 5 to 30 wt %. The average particle size of the powders of the invention is preferably less than 400 μm, more preferably less than 100 μm, and more particularly between 1 and 250 μm, more preferably between 1 and 75 μm, as measured by laser granulometry. The term "average particle size" in the sense of the present patent application corresponds to the median of the particle volume distribution, i.e., to the D50 figure.

A further subject of the present invention is a process for preparing the composition of the invention by reacting a water-soluble calcium compound with a water-soluble silicate compound, the reaction of the water-soluble calcium compound with the water-soluble silicate compound taking place in the presence of water which at least partially comprises the at least one acid group-containing polymer of the invention. The at least one polyalkylene glycol ether of the invention, of the formula (1), and optionally the remaining amount of the at least one acid group-containing polymer of the invention, may here, independently of one another, either be introduced in the aqueous phase prior to the reaction of the water-soluble calcium compound with the water-soluble silicate compound, or added during the reaction. Preferably the at least one polyalkylene glycol ether of the invention, of the formula (1), and optionally the remaining amount of the at least one acid group-containing polymer of the invention are added after the reaction of the water-soluble calcium compound with the water-soluble silicate compound.

Suitable water-soluble calcium compounds and water-soluble silicate compounds are in each case in principle even compounds having only relatively poor solubility in water, although compounds with good water-solubility (which dissolve completely or near-completely in water) are preferred in each case. It is necessary, however, to ensure that the reactivity is sufficient for the reaction in the aqueous environment with the corresponding reactant (either water-soluble calcium compound or water-soluble silicate compound). The solubility of the calcium compounds and of the silicate compound is preferably greater than 0.005 mol/l water, determined at 20° C. under atmospheric pressure.

In one preferred embodiment, the at least one acid group-containing polymer of the invention is introduced at least partially in water, and the water-soluble calcium compounds and the water-soluble silicate compounds are subsequently added simultaneously but separately from one another.

In the process of the invention, the molar ratio of calcium to silicon is in particular 0.6 to 2.0, preferably 0.8 to 1.8, more preferably 0.9 to 1.6, especially preferably 0.9 to 1.5.

Particularly suitable water-soluble calcium compounds are calcium nitrate, calcium hydroxide, calcium acetate, calcium sulfamate and/or calcium methanesulfonate.

The water-soluble silicate compound is selected from sodium silicate, potassium silicate, waterglass, aluminum silicate, calcium silicate, silica, sodium metasilicate, potassium metasilicate, and mixtures of two or more of these components. With particular preference the water-soluble silicate compound is selected from an alkali metal silicate of the formula m $SiO_2$.n $M_2O$, where M is Li, Na, K, and $NH_4$, preferably Na or K, or mixtures thereof, m and n are molar numbers, and the ratio of m:n is about 0.9 to about 4, preferably about 0.9 to about 3.8, and more particularly about 0.9 to about 3.6. The term "waterglass" refers to water-soluble salts of the silicic acids that have solidified from the fluid melt, more particularly potassium silicate and sodium silicate or their aqueous solutions, as found under the entry heading "Waterglass" (most recently updated in May 2004) in the online reference work RÖMPP (Thieme Verlagsgruppe).

In the first step, customarily, a suspension is obtained which comprises the calcium silicate hydrate in finely disperse form. The solids content of the suspension is preferably between 5 and 40 wt %, more preferably between 10 and 35 wt %, especially preferably between 10 and 30 wt %. The average primary particle size of the individual calcium silicate hydrate particles in the suspension of the invention is preferably less than 500 nm, more preferably less than 250 nm, and more particularly between 1 and 150 nm, as measured by ultra-small angle X-ray radiation (Soft Matter, 2013, 9, 4864).

Regarding the preparation of the calcium silicate hydrate in accordance with the present invention, reference is further made to patent applications WO2010/026155, WO2011/026720, and WO2011/029711, whose content is hereby incorporated in its entirety into the present application. In this regard, furthermore, reference is also made to the as yet unpublished applications PCT/EP2014/051494 and PCT/EP2014/051485, whose content is hereby incorporated in its entirety into the present application.

In one particularly preferred embodiment, the process of the invention further comprises a drying step. The drying may take place more particularly by roll drying, spray drying, drying in a fluidized bed process, by bulk drying at elevated temperature, or other customary drying methods. The preferred range of the drying temperature is between 50 and 250° C. Especially preferred for the drying step is spray drying, which is carried out preferably at a temperature of between 100 and 240° C. In this procedure, the composition of the invention is obtained preferably in the form of a powder.

The residual moisture content of the powder is preferably less than 10 wt %, more preferably less than 5 wt %, and especially preferably less than 3 wt %.

A further subject of the present invention is a mixture comprising a cementitious binder and 0.01 to 10 wt % of the composition of the invention, based on the overall mass of the mixture. The reference parameter "overall mass of the mixture" here embraces the composition of the invention.

In other words, it relates to a mixture prepared from a component comprising a cementitious binder and 0.01 to 10 wt % of the composition of the invention, based on the overall mass of the mixture.

The cementitious binder preferably comprises at least one from the series of cement based on Portland cement, white cement, calcium aluminate cement, calcium sulfoaluminate cement, and latent hydraulic or puzzolanic binder.

In one particularly preferred embodiment, the mixture which comprises a cementitious binder comprises at least one compound from the series of silica sand, finely ground quartz, limestone, heavy spar, calcite, aragonite, vaterite, dolomite, talc, kaolin, nonswellable double-layer silicate (e.g., mica), swellable double-layer silicates (e.g., bentonites), chalk, titanium dioxide, rutile, anatase, aluminum hydroxide, aluminum oxide, magnesium hydroxide, and brucite. In particular, the overall mass of the mixture may consist to an extent of at least 30 wt %, more particularly at least 40 wt %, and more preferably at least 50 wt % of at least one compound from the series of silica sand, finely ground quartz, limestone, heavy spar, calcite, aragonite, vaterite, dolomite, talc, kaolin, nonswellable double-layer silicates (e.g., mica), swellable double-layer silicates (e.g., bentonites), chalk, titanium dioxide, rutile, anatase, aluminum hydroxide, aluminum oxide, magnesium hydroxide, and brucite.

The mixture which comprises a cementitious binder is preferably a dry mortar. Continual efforts toward substantial rationalization and also improved product quality have meant that in the construction sector, mortars for any of a very wide variety of uses are nowadays hardly any longer mixed together from the starting materials on the building site itself. This function has now been largely taken over at the factory in the construction materials industry, and the ready-to-use mixtures are made available in the form of what are called factory dry-mix mortars. Completed mixtures which are rendered workable on the building site exclusively by addition of water and commixing are referred to in accordance with DIN 18557 as factory mortars, more particularly as factory dry-mix mortars. Mortar systems of this kind may fulfill any of a very wide variety of physical construction objectives. Depending on the objective imposed, the cementitious binder has further additives or admixtures added to it, in order to adapt the factory dry-mix mortar to the specific end use. The additives and admixtures in question may include, for example, shrinkage reducers, expansion agents, accelerators, retarders, thickeners, defoamers, air entrainers, and corrosion inhibitors. The factory dry-mix mortar of the invention may more particularly comprise masonry mortars, render mortars, mortars for thermal insulation composite systems, renovating renders, jointing mortars, tile adhesives, thin bed mortars, screed mortars, casting mortars, injection mortars, filling compounds, grouts, or lining mortars (e.g., for drinking water pipes).

In one particular embodiment, the mixture according to the invention may also be a self-leveling underlayment composition. This is particularly advantageous because compositions of this kind in powder form for small layer thicknesses are generally very fine and are therefore comparatively slow to mix with water. Also included are factory mortars which at the preparation stage in the building site may be provided not only with water but also with further components, especially liquid and/or powder additives, and/or with aggregates (two-component systems).

A further subject of the present invention is the use of the composition of the invention in a mixture in powder form that comprises a cementitious binder, for accelerating the development over time of the dispersing activity of the acid group-containing polymer after addition of the mixing water and after subsequently accelerated curing of the mixture. Preference is given to using 0.01 to 10 wt %, more particularly 0.01 to 5 wt %, especially preferably 0.1 to 2 wt % of the composition of the invention, based on the overall mass of the pulverulent mixture comprising a cementitious binder.

The reference parameter "overall mass" here encompasses the composition of the invention.

The examples which follow illustrate the advantages of the present invention.

EXAMPLES

Gel Permeation Chromatography

Sample preparation for the determination of molar weight was carried out by dissolving polymer solution in the GPC eluent, giving a polymer concentration in the GPC eluent of 0.5 wt %. This solution was then filtered through a syringe filter with polyethersulfone membrane and pore size of 0.45 μm. The injection volume of this filtrate was 50-100 μl.

The average molecular weights were determined on a Waters GPC instrument with model name Alliance 2690 with a UV detector (Waters 2487) and an RI detector (Waters 2410).

Columns: Shodex SB-G Guard Column for SB-800 HQ series
Shodex OHpak SB 804HQ and 802.5HQ
(PHM gel, 8×300 mm, pH 4.0 to 7.5)
Eluent: 0.05 M aqueous ammonium formate/methanol mixture=80:20 (parts by volume)
Flow rate: 0.5 ml/min
Temperature: 50° C.
Injection: 50 to 100 μl
Detection: RI and UV The molecular weights of the polymers were determined using two different calibrations. First they were determined relative to polyethylene glycol standards from PSS Polymer

Standards Service GmbH. The molecular weight distribution curves of the polyethylene glycol standards were determined by light scattering. The masses of the polyethylene glycol standards were 682 000, 164 000, 114 000, 57 100, 40 000, 26 100, 22 100, 12 300, 6240, 3120, 2010, 970, 430, 194, 106 g/mol.

Chemistry of Polycarboxylate Ethers Used
The polymers used have the following composition:

TABLE 1

| Polymer | Mol of acrylic acid | Mol of macromonomer | Macromonomer | Mw (g/mol) |
|---|---|---|---|---|
| A | 10 | 1 | VOBPEPG-3000 | 21 000 |
| B | 5 | 1 | VOBPEPG-3000 | 27 000 |

The abbreviation VOBPEPG-3000 stands for vinyloxybutyl-polyethylene/propylene glycol of blockwise construction. Block A contains only polyethylene glycol, block B a random mixture of ethylene glycol and propylene glycol. The molar mass is 3000 g/mol. The structure conforms to formula ω with n~23, k~13, l~28.

Formula ω

The MPEG500 and MPEG1000 used in all of the examples are Pluriol® A 500 E and Pluriol A 1020 E, respectively (commercial products from BASF SE).

Preparation of Polycarboxylate Ether B

A 1000 ml four-neck flask with thermometer, pH meter, and reflux condenser was charged with 385 g of water and 360 g (0.12 mol) of VOBPEPG-3000.

This mixture is cooled to 15° C. Then 0.5 g of 2% strength $FeSO_4 \cdot 18H_2O$ solution and 42.4 g (0.59 mol) of 99% acrylic acid are added. This is followed by addition of 1.8 g of mercaptoethanol and 5 g of Brüggolit FF6. At this point a pH of around 4.6 becomes established. After a mixing time of 2 minutes, 2.5 g of 50% strength $H_2O_2$ solution are added. Polymerization begins after a short time and a steady temperature rise is seen. After about 2 minutes, the reaction attains the temperature maximum of about 42° C. and a pH of 4.2. After a further 5 minutes, the batch is adjusted to a pH of 5.5 with 30 g of 20% strength NaOH solution. This gives a clear aqueous polymer solution pale yellowish in color and having a solids content of 50 wt %.

Polycarboxylate ether A is prepared analogously, with the solids content likewise being 50 wt %.

Using the solution of polymer A for preparing additive V1, and the solution of polymer B for preparing additive V2, each of the solutions is dried using a Niro Mobil Minor spray dryer. Atomization took place with a two-fluid nozzle with a stream of nitrogen. Entry temperature 230° C., exit temperature 100° C.

Preparation Protocol for Nanoscale CSH Solution
Preparation of Carrier Component T
Raw materials used:
Calcium hydroxide (Merck KGaA, purity 97%)
Calcium acetate monohydrate (Sigma Aldrich Co. LLC, >99.0%)
Defoamer (Melflux DF 93 from BASF Construction Solutions GmbH, solids content=60.0 wt %)

Na waterglass (BASF SE, Natriumwasserglas 37/40 PE, solids content 36.1 wt %, modulus $n(SiO_2)/n(Na_2O)=3.4$)
Polymer A as 36.1 wt % strength aqueous solution
Description of Synthesis:
Calcium Source CL:
The calcium source CL has the following composition:

| Substance | Fraction wt % |
|---|---|
| Calcium hydroxide suspension (30 wt %) | 32.7 |
| Calcium acetate monohydrate | 10.1 |
| Water | 57.2 |

The calcium source is prepared by the following steps:
(i) introducing the water
(ii) adding an aqueous 30 wt % calcium hydroxide suspension
(iii) adding calcium acetate monohydrate.

The suspension is stirred permanently at 40 rpm (revolutions per minute) using a mechanical agitator with paddle stirrer, in order to prevent sedimentation of the calcium hydroxide.

Silicate Source SL:
The silicate source SL has the following composition:

| Substance | Fraction wt % |
|---|---|
| Na waterglass (36.1 wt % form) | 49.8 |
| Water | 50.2 |

The silicate source SL is prepared by introducing water and adding Na waterglass with stirring at 40 rpm.

Stabilizer Solution STL:
The stabilizer solution STL had the following composition:

| Substance | Fraction wt % |
|---|---|
| Polymer A (36.1 wt % strength aqueous solution) | 38.7 |
| Melflux DF 93 (defoamer) | 2.3 |
| Water | 61.0 |

The stabilizer solution STL is prepared by the following steps:
(i) introducing the water
(ii) adding polymer A
(iii) adding Melflux DF 93

The solution is stirred permanently at 40 rpm and the temperature is adjusted to 22° C.

To produce the carrier component T, the stabilizer solution STL is introduced into a reactor and stirred at 40 rpm. Connected to this reactor is a 20 ml 3-channel mixing cell. The mixing cell is equipped with an Ika Ultra Turrax which drives a rotor-stator dispersing tool (Ika, S 25 KV-25F) at 10 000 rpm. The stabilizer solution STL is pumped in circulation through the mixing cell using an Ismatec MCP process peristaltic pump, with a pumping rate of 108.83 g/min at a rotary speed of 50 rpm. During a synthesis time of 150 minutes, the calcium source CL and the silicate source SL are introduced in parallel into the mixing cell by means of peristaltic pumps, at a constant mass ratio of CL/SL=1.36, and are mixed with the stabilizer solution STL. The calcium source CL is pumped into the mixing cell at a constant pumping rate of 2.33 g/min, and the silicate source SL at a constant pumping rate of 1.71 g/min. In total, 1.53 parts by weight of the stabilizer solution STL are mixed with 1.36 parts by weight of the calcium source and 1.0 part by weight of the silicate source. Following complete metering of the calcium source CV and the silicate source SL, the reaction mixture is stirred for a further 15 minutes at 40 rpm. The resultant solids content of the carrier component T is 16.5 wt %.

General Preparation Protocol for Comparative Product V4 and Inventive Products V5 to V9

The quantities of MPEG 500 and polymer A or polymer B as indicated in table 2 are mixed with stirring into 1 kg of 16.5% carrier component T (nanoscale CSH suspension).

This mixture was dried using a Niro Mobil Minor spray dryer. Atomization took place with a two-fluid nozzle and a stream of nitrogen. Entry temperature 230° C., exit temperature 100° C. The result is a fine, nonsticking, white powder. The powder has a residual moisture content of 1.7 wt %.

Preparation Protocol for Comparative Example V3

For comparative example V3, polycarboxylate ether solution in methylpolyethylene glycol (MPEG500) is prepared in a method based on example 4 of EP 2574636 A1 (see page 10, lines 20-27), with pure MPEG500 being used rather than an MPEG500/glycerol carbonate mixture. It is obtained in the form of an anhydrous liquid. The mixing of the polycarboxylate ether solution with the binder system takes place in analogy to use example 1 on page 10 of EP 2574636 A1. 1000 g of binder system, consisting of 500 g of cement (CEM I 52.5 R, Milke type from HeidelbergCement) and 500 g of fine silica sand (type H33 from Quarzwerke Frechen), are stirred at 500 revolutions per minute in a beaker with an axial stirrer. Added to this mixture are 3.0 g of polycarboxylate ether solution in methylpolyethylene glycol (additive V3A) (corresponding to 0.30 wt % of pure polycarboxylate ether, based on the cement content).

ments Ltd, Great Britain) using the fully automated measurement program implemented in the instrument (selected settings: shaking rate 40% and air pressure 1.5 bar), giving a measurement of 11 μm (D50 value).

Performance Tests

Mixing and Testing Technique

For the testing of the adsorption and fluidization rate of the various plasticizers, an intensive mixture from Eirich, model EL 1 Laboratory, was selected, having an eccentrically arranged mixing tool and inclined mixing vessel. The background to the selection of the mixture was that it enables reliable and reproducible production of the cement mortars with the possibilities of variable adaptation of the speed of the mixing tool and detection of the electrical drive power during the mixing operation. In the mixer, the mixing vessel is actively driven, thereby transporting the mixture material to the mixing tool. As a result of the eccentric position of the mixing tool, in combination with the inclined mixing vessel, there is extensive change of position of the mixture material both vertically and horizontally. The inclination of the mixing vessel also acts to counter the separation of heavy particles into the outer regions, since gravity acts to return the entire mixing material into the mixing flow continuously. A computer control in conjunction with a frequency converter allows the speed of the mixing tool to be regulated steplessly in a range from 1 to 30 m/s. During the mixing operation, moreover, it is possible to capture and record the electrical drive power P at the mixing tool. In all of the experiments, the speed of the mixing tool was set at 4 m/s on the codirectional-flow principle. The speed of the mixing vessel was 1 m/s. All of the experiments were carried out with a constant dry-mix mortar weight of 1 kg.

In order to allow a quantitative comparison of the acceleration of the development, over time, of the dispersing activity on the part of the acid group-containing polymer, calculations were made of the stabilization time $t_s$ from the recorded power curve of the mixing tool. The numerical value of the stabilization time $t_s$ here is a direct measure of the development over time of the dispersing effect by the

TABLE 2

Preparation of comparative product V4 and of inventive products V5 to V9

| Product | Carrier component | Amount of carrier component solution in g | Type of polyethylene glycol component | MPEG500 in g | Type of polymer | Amount of polymer solution in g (50 wt % strength solution) | Fraction of polymer in the product in wt % | Residual moisture content % after spray drying |
|---|---|---|---|---|---|---|---|---|
| V4 | T | 1000 |  | 0 | A | 110 | 47.7 | 1.9 |
| V5 | T | 1000 | MPEG500 | 55 | A | 110 | 38.1 | 1.7 |
| V6 | T | 1000 | MPEG500 | 35.4 | A | 70.8 | 36.2 | 2.2 |
| V7 | T | 1000 | MPEG500 | 27.5 | A | 165 | 48.1 | 2.3 |
| V8 | T | 1000 | MPEG1000 | 55 | A | 110 | 38.1 | 1.5 |
| V9 | T | 1000 | MPEG500 | 55 | B | 110 | 38.1 | 2.1 |

The residual moisture content in table 2 was determined by drying the sample to constant weight at 90° C.

"Fraction of polymer in the product in wt %" indicates the total amount of polymer in the product, originating from the preparation of the carrier component and in each case from the preparation of the products V4 to V9.

The particle size of the powder V5 was determined by laser granulometry on a Mastersizer 2000 (Malvern Instruacid group-containing polymer. The smaller this value, the more rapid the development over time of the dispersing effect of the acid group-containing polymer.

The stabilization time ($t_s$) is defined as the time at which the power curve of the mixing tool approaches the asymptote after the maximum drive power has been reached. Optimum material properties are present as soon as the power curve no longer drops significantly.

Figure 1:
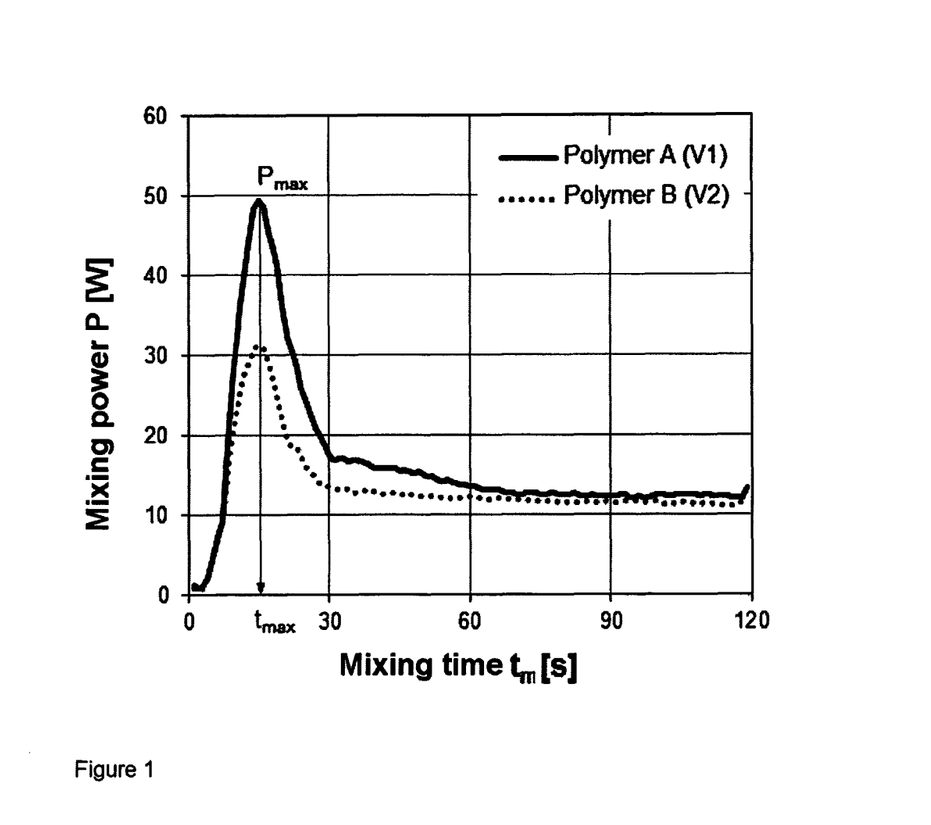
FIGS. 1 and 2 are graphical representations of mixing time as a function of mixing power.
Figure 2:
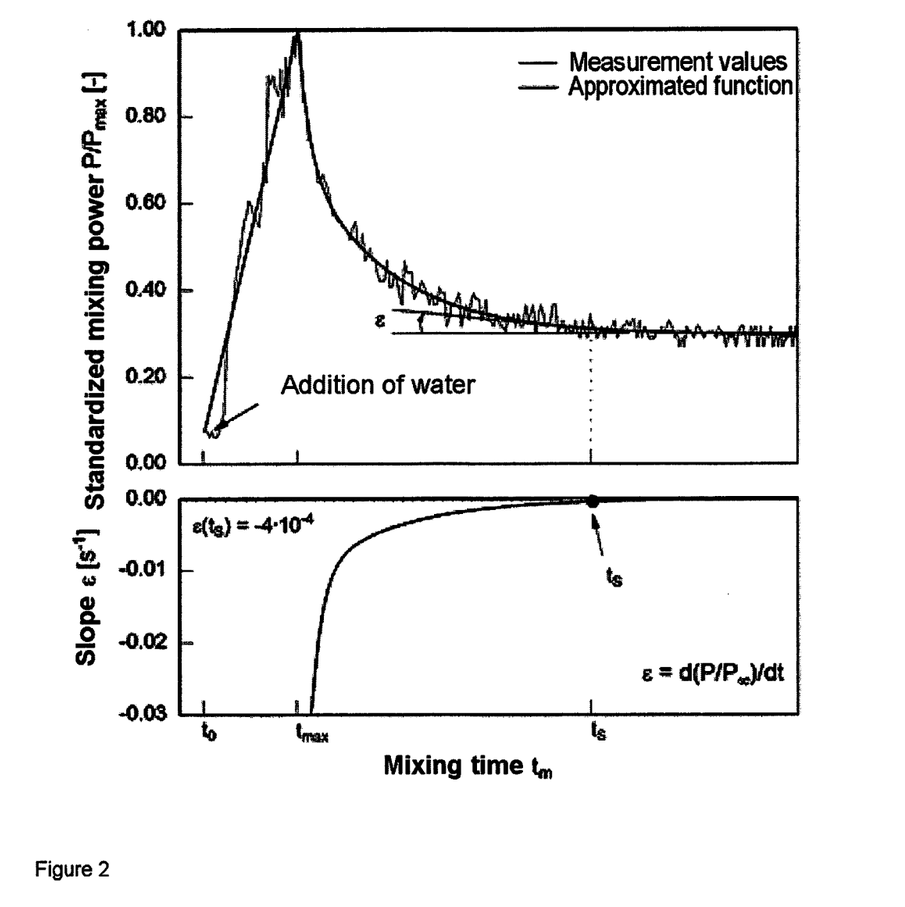

By calculation of the stabilization time, accordingly, it is possible to determine the mixing time required. For the calculation of stabilization time, the power P was standardized to the maximum power $P_{max}$ (see FIG. 1). Thereafter the power curve recorded was approximated with a mathematic function. This was done between the start of mixing to and until attainment of maximum power at time $t_{max}$, by linear approximation. Shown by way of example in FIG. 2 is the standardized mixing power $P/P_{max}$ and its curve slope $\square$ during the mixing operation, from which it is possible to calculate the stabilization time $t_s$. The subsequent range was approximated with a decreasing exponential function (equation 1).

$$\frac{P}{P_{max}} = P_0 + P_1 e^{-\frac{t-t_{max}}{t_1}} + P_2 e^{-\frac{t-t_{max}}{t_2}} \quad \text{(Equation 1)}$$

In this equation, $P_0$, $P_1$ and $P_2$ are adapted power parameters, $t_1$ and $t_2$ are adapted time parameters. The stabilization time $t_s$ is defined as the time required for the curve slope to reach a criterion of $\varepsilon(t_s) = -4 \cdot 10^4 \text{ s}^{-1}$ (in this regard, see: Chopin, D.; de Larrad, F.; Cazacliu, B.: Why do HPC and SCC require a longer mixing time? Cement and Concrete Research 34, 2004, pp. 2237-2243 and Mazanec, O.; Schießl, P.: Mixing Time Optimisation for UHPC. Ultra High Performance Concrete (UHPC). In: Second International Symposium on Ultra High Performance Concrete, Mar. 5-7, 2008, pp. 401-408, ISBN: 978-3-89958-376-2).

On attainment of the stabilization time $t_s$, all of the mortars investigated have optimum fresh mortar properties, which is a sign of complete dispersion of the starting materials.

Mixing and Testing Procedure

All experiments were carried out in an air-conditioned room at a temperature of 20±2° C./65% relative humidity. The dry starting materials were stored in a conditioned room at a temperature of 20±2° C. in the absence of air. The temperature of the mixing water was adjusted such that the temperature of the mixture material at the end of the mixing operation was 20±2° C. Prior to the addition of water, the dry starting materials (cement, silica sand, and pulverulent plasticizer) were homogenized for 30 seconds at a tool speed of 4 m/s. Thereafter the whole of the mixing water was added via a funnel over the course of 10 seconds to the dry-mix mortar mixture, and mixed with the other starting materials for 120 seconds. The stabilization times reported are always based on the wet mixing time, including addition of water.

Mixture of Composition

The cement mortar of examples I to X was composed of 500 g of cement (CEM I 52.5 R, Milke type from HeidelbergCement) and 500 g of fine silica sand (type H33 from Quarzwerke Frechen). The water content was 150 g (w/c=0.30).

Measurement of the Retardation Effect for Plasticizer by Heat Flow Calorimetry

The quality of cement hydration was characterized by isothermal heat flow calorimetry (TAM Air Thermostat, Thermometric with 12 channels). The temperature in the heat flow calorimeter at the start of hydration was 20° C. Cement, sand, and water (w/c of 0.30) were mixed with the respective additive in a test tube for one minute. The test tube was subsequently inserted into the sample chamber of the heat flow calorimeter, and data recording was commenced. The hydration data were recorded over a period of at least 24 hours. For evaluation, the cumulative heat flow was calculated, in J/g cement. Table 4 sets out the cumulative heat flow after 12 h. The higher the heat flow, the smaller the retardant effect of the plasticizer.

TABLE 3

| Example | Additive | Additive in wt % bwoc | Polymer in wt % bwoc | Stabilization time $t_s$ [s] | Cumulative heat flow after 12 h [J/g] | Notes |
|---|---|---|---|---|---|---|
| I | — | 0 | 0 | — | 73.9 | earth-moist heap, no fluidaztion |
| II | V1 | 0.30 | 0.30 | 96 | — | |
| III | V2 | 0.30 | 0.30 | 51 | 52.4 | |
| IV | V4 | 0.63 | 0.30 | 73 | — | |
| V3 | V3A | 0.60 | 0.30 | 35 | 48.7 | |
| VI | V5 | 0.79 | 0.30 | 22 | 75.8 | |
| VII | V6 | 0.83 | 0.30 | 25 | 72.5 | |
| VIII | V7 | 0.62 | 0.30 | 33 | 71.1 | |
| IX | V8 | 0.79 | 0.30 | 31 | 73.4 | |
| X | V9 | 0.79 | 0.30 | 34 | 76.1 | |

"% bwoc": Amount of initial mass, based on the amount of cement
The amount of additive was selected in examples II to X such that in each case the same amount of polymer was used, based on the amount of cement.

In table 3 it is apparent that only inventive examples VI to X permit an acceleration of the development over time of the dispersing activity of the acid group-containing polymer, in the present instance a polycarboxylate ether, following addition of the mixing water, as evident from the low values for $t_s$, and, at the same time, a subsequently accelerated curing of the mixture, measured by way of the cumulative heat flow after 12 hours.

The invention claimed is:

1. A composition comprising
    5-50 wt % of calcium silicate hydrate,
    10-60 wt % of at least one water-soluble, acid group-containing polymer comprising polyether groups,
    5 to less than 30 wt % of at least one polyalkylene glycol ether of the formula (1)

where
    $R^\alpha$ is hydrogen or an aliphatic hydrocarbon radical having 1 to 20 C atoms, a cycloaliphatic hydrocarbon radical having 5 to 8 C atoms, or an optionally substituted aryl radical having 6 to 14 C atoms, the aryl radical comprising no acid groups, and β independently at each occurrence and in a manner identical or different for each $(C_\beta H_{2\beta}O)$ unit is 2, 3, 4 or 5, and ω is 3 to 200, wherein the weight percentages are based on the total weight of the composition.

2. The composition according to claim 1, wherein the polyether groups of the at least one water-soluble, acid group-containing polymer are polyether groups of the structural unit (I), (I)

where

* indicates the bonding site to the acid group-containing polymer,

U is a chemical bond or an alkylene group having 1 to 8 C atoms,

X is oxygen, sulfur or a group $NR^1$, k is 0 or 1, n is an integer whose average value, based on the acid group-containing polymer, is in the range from 3 to 300, Alk is $C_2$-$C_4$ alkylene, and within group $(Alk-O)_n$ Alk may be identical or different, W is a hydrogen, a $C_1$-$C_6$ alkyl, or an aryl radical or is the group Y-F, where Y is a linear or branched alkylene group having 2 to 8 C atoms and optionally may carry a phenyl ring, F is a 5- to 10-membered nitrogen heterocycle which is bonded via nitrogen and which as ring members, besides the nitrogen atom and beside carbon atoms, optionally may have 1, 2 or 3 additional heteroatoms selected from oxygen, nitrogen, and sulfur, it being possible for the nitrogen ring members to have a group $R^2$, and for 1 or 2 carbon ring members to be present in the form of a carbonyl group, $R^1$ is hydrogen, $C_1$-$C_4$ alkyl or benzyl, and $R^2$ is hydrogen, $C_1$-$C_4$ alkyl or benzyl.

3. The composition according to claim 1, wherein the acid group of the water-soluble polymer is at least one from the series of carboxyl, phosphono, sulfino, sulfo, sulfamido, sulfoxy, sulfoalkyloxy, sulfinoalkyloxy, and phosphonooxy group.

4. The composition according to claim 1, wherein the water-soluble, acid group-containing polymer comprising polyether groups is a polycondensation product comprising
   (II) a structural unit containing an aromatic or heteroaromatic and a polyether group, and
   (III) a phosphated structural unit containing an aromatic or heteroaromatic.

5. The composition according to claim 4, wherein the structural units (II) and (III) are represented by the following general formulae (II)

where

A is identical or different and is represented by a substituted or unsubstituted, aromatic or heteroaromatic compound having 5 to 10 C atoms in the aromatic system, the other radicals possessing the definition stated for structural unit (I);

(III)

where

D is identical or different and is represented by a substituted or unsubstituted, aromatic or heteroaromatic compound having 5 to 10 C atoms in the aromatic system, where E is identical or different and is represented by N, NH or O, where m=2 if E=N and m=1 if E=NH or O, where $R^3$ and $R^4$ independently of one another are identical or different and are represented by a branched or unbranched $C_1$ to $C_{10}$ alkyl radical, $C_5$ to $C_8$ cycloalkyl radical, aryl radical, heteroaryl radical or H, where b is identical or different and is represented by an integer from 0 to 300.

6. The composition according to claim 4, wherein the polycondensation product comprises a further structural unit (IV) which is represented by the following formula (IV)

where

Y independently at each occurrence is identical or different and is represented by (II), (III) or further constituents of the polycondensation product, and where $R^5$ and $R^6$ are identical or different and are represented by H, $CH_3$, COOH or a substituted or unsubstituted aromatic or heteroaromatic compound having 5 to 10 carbon atoms.

7. The composition according to claim 1, wherein the water-soluble, acid group-containing polymer comprising polyether groups is at least one copolymer which is obtained by polymerization of a mixture of monomers comprising
   (V) at least one ethylenically unsaturated monomer which comprises at least one radical from the series of carboxylic acid, carboxylic salt, carboxylic ester, carboxylic amide, carboxylic anhydride, and carboxylic imide and
   (VI) at least one ethylenically unsaturated monomer having a polyether group.

8. The composition according to claim 7, wherein the ethylenically unsaturated monomer (V) is represented by at least one of the following general formulae from the group of (Va), (Vb), and (Vc)

(Va)

(Vb)

where
R⁷ and R⁸ independently of one another are hydrogen or an aliphatic hydrocarbon radical having 1 to 20 C atoms, B is H, —COOM$_a$, —CO—O($C_qH_{2q}O)_r$—R⁹, or —CO—NH—($C_qH_{2q}O)_r$—R⁹, M is hydrogen, a mono-, di- or trivalent metal cation, ammonium ion, or an organic amine radical, a is 1/3, 1/2 or 1,

R⁹ is hydrogen, an aliphatic hydrocarbon radical having 1 to 20 C atoms, a cycloaliphatic hydrocarbon radical having 5 to 8 C atoms, or an optionally substituted aryl radical having 6 to 14 C atoms, q independently at each occurrence and in a manner identical or different for each ($C_qH_{2q}O$) unit is 2, 3 or 4 and, r is 0 to 200, Z is O, NR¹⁶, R¹⁶ independently at each occurrence is identical or different and is represented by a branched or unbranched $C_1$ to $C_{10}$ alkyl radical, $C_5$ to $C_8$ cycloalkyl radical, aryl radical, heteroaryl radical or H, (Vc)

where
R¹⁰ and R¹¹ independently of one another are hydrogen or an aliphatic hydrocarbon radical having 1 to 20 C atoms, a cycloaliphatic hydrocarbon radical having 5 to 8 C atoms, or an optionally substituted aryl radical having 6 to 14 C atoms, R¹² is identical or different and is represented by ($C_nH_{2n}$)—SO₃H with n=0, 1, 2, 3 or 4, ($C_nH_{2n}$)—OH with n=0, 1, 2, 3 or 4; ($C_nH_{2n}$)—PO₃H₂ with n=0, 1, 2, 3 or 4, ($C_nH_{2n}$)—OPO₃H₂ with n=0, 1, 2, 3 or 4, ($C_6H_4$)—SO₃H, ($C_6H_4$)—PO₃H₂, ($C_6H_4$)—OPO₃H₂, or ($C_nH_{2n}$)—NR¹⁴$_b$ with n=0, 1, 2, 3 or 4 and b=2 or 3, R¹³ is H, —COOM$_a$, —CO—O($C_qH_{2q}O)_r$—R⁹, or —CO—NH—($C_qH_{2q}O)_r$—R⁹, where Me, R⁹, q, and r possess definitions stated above, R¹⁴ is hydrogen, an aliphatic hydrocarbon radical having 1 to 10 C atoms, a cycloaliphatic hydrocarbon radical having 5 to 8 C atoms, or an optionally substituted aryl radical having 6 to 14 C atoms, Q is identical or different and is represented by NH, NR¹⁵ or O; where R¹⁵ is an aliphatic hydrocarbon radical having 1 to 10 C atoms, a cycloaliphatic hydrocarbon radical having 5 to 8 C atoms, or an optionally substituted aryl radical having 6 to 14 C atoms.

9. The composition according to claim 1, which is present as a powder.

10. The composition according to claim 1, wherein the molar ratio of calcium to silicon in the calcium silicate hydrate is 0.6 to 2.0.

11. The composition according to claim 1, wherein, in formula (1) of the polyalkylene glycol ether,
R$^α$ is an aliphatic hydrocarbon radical having 1 to 4 C atoms,
β independently at each occurrence and in a manner identical or different for each ($C_βH_{2β}O$) unit is 2 or 3, and
ω is 8 to 100.

12. A process for preparing a composition according to claim 1, which comprises reacting a water-soluble calcium compound with a water-soluble silicate compound, the reaction of the water-soluble calcium compound with the water-soluble silicate compound taking place in the presence of water which at least partly comprises the at least one acid group-containing polymer.

13. The process according to claim 12, wherein the molar ratio of calcium to silicon is 0.6 to 2.0.

14. A mixture comprising a cementitious binder and 0.01 to 10 wt % of a composition according to claim 1, based on the overall mass of the mixture.

15. A method comprising utilizing the composition according to claim 1 in a pulverulent mixture comprising a cementitious binder, for accelerating the development over time of the dispersing action of the acid group-containing polymer following addition of the mixing water and a subsequently accelerated curing of the mixture.

* * * * *

UNITED STATES PATENT AND TRADEMARK OFFICE
CERTIFICATE OF CORRECTION

PATENT NO. : 10,005,695 B2
APPLICATION NO. : 15/316547
DATED : June 26, 2018
INVENTOR(S) : Bichler et al.

It is certified that error appears in the above-identified patent and that said Letters Patent is hereby corrected as shown below:

On the Title Page

In the Notice section "days." is printed twice. One of them should be removed.

In the Claims

Claim 2, Column 19, Line 13: the (*) is missing. It should be corrected to read as follows:
"* indicates the bonding site to the acid group-containing".

Claim 8, Column 22, Line 2: the formula currently reads -CO-NH-$(C_qH_{2q}O)_r$-$R^9$, where $M_e$, $R^9$, q, and r. $M_e$ incorrectly replaced $M_a$.

Signed and Sealed this
Fourth Day of June, 2019

Andrei Iancu
*Director of the United States Patent and Trademark Office*